US012010499B2

(12) United States Patent
Zhu et al.

(10) Patent No.: US 12,010,499 B2
(45) Date of Patent: Jun. 11, 2024

(54) MICRO SPEAKER WITH SYMMETRICAL VOICE COIL AND MAGNETIC CIRCUIT

(71) Applicant: HARMAN INTERNATIONAL INDUSTRIES, INCORPORATED, Stamford, CT (US)

(72) Inventors: Zhenjin Zhu, Guangdong (CN); Yuanzhen Niu, Guangdong (CN); Jihui Zeng, Guangdong (CN); Hong Wen, Guangdong (CN)

(73) Assignee: Harman International Industries, Incorporated, Stamford, CT (US)

( * ) Notice: Subject to any disclaimer, the term of this patent is extended or adjusted under 35 U.S.C. 154(b) by 263 days.

(21) Appl. No.: 17/614,926

(22) PCT Filed: May 30, 2019

(86) PCT No.: PCT/CN2019/089298

§ 371 (c)(1),
(2) Date: Nov. 29, 2021

(87) PCT Pub. No.: WO2020/237575

PCT Pub. Date: Dec. 3, 2020

(65) Prior Publication Data

US 2022/0240020 A1 Jul. 28, 2022

(51) Int. Cl.

*H04R 9/06* (2006.01)
*H04R 1/02* (2006.01)
*H04R 7/12* (2006.01)
*H04R 9/02* (2006.01)
*H04R 9/04* (2006.01)

(52) U.S. Cl.

CPC ............... *H04R 9/06* (2013.01); *H04R 1/028* (2013.01); *H04R 7/12* (2013.01); *H04R 9/025* (2013.01); *H04R 9/046* (2013.01); *H04R 2499/11* (2013.01)

(58) Field of Classification Search

CPC . H04R 9/06; H04R 1/028; H04R 7/12; H04R 9/025; H04R 9/046; H04R 2499/11

See application file for complete search history.

(56) References Cited

U.S. PATENT DOCUMENTS

2018/0192217 A1* 7/2018 Hogan ................ H04R 29/003

FOREIGN PATENT DOCUMENTS

| | | |
|---|---|---|
| CN | 203368739 U | 12/2013 |
| CN | 208445745 U | 1/2019 |
| JP | 2000308185 A | 11/2000 |

OTHER PUBLICATIONS

International Search Report and Written Opinion dated Feb. 21, 2020 for PCT Application No. PCT/CN2019/089298 filed May 30, 2019, 9 pages.

* cited by examiner

*Primary Examiner* — David L Ton

(74) *Attorney, Agent, or Firm* — Brooks Kushman P.C.

(57) ABSTRACT

An ultra slim micro-speaker is provided with a middle gasket between the voice coil and the diaphragm is provided. A distance between a top of a top plate and a top of the voice coil can be equal to a distance between a bottom of the top plate and a bottom of the voice coil, and a winding height has a symmetrical relationship in the magnetic circuit with a BL(x) curve of the magnetic circuit having improved symmetry.

18 Claims, 4 Drawing Sheets

MICRO SPEAKER WITH SYMMETRICAL VOICE COIL AND MAGNETIC CIRCUIT

CROSS-REFERENCE TO RELATED APPLICATIONS

This application is the U.S. national phase of PCT Application No. PCT/CN2019/089298 filed on May 30, 2019, the disclosure of which is hereby incorporated in its entirety by reference herein.

TECHNICAL FIELD

The present disclosure generally relates to a speaker. More particularly, the present disclosure relates to an ultra slim micro-speaker with a thin structure and symmetrical voice coil and magnetic circuit.

BACKGROUND

Nowadays, electronic products are gradually developing in the direction of integration and thinning. The requirements for micro-speakers in the market are also getting higher and higher. The specific performances are required to the micro-speaker including such as to be slim and with high sensitivity, a better bass, and with lower distortion at low frequency.

Speakers convert electrical energy into sound. A structure of the existing ultra slim micro-speaker typically includes a diaphragm, a magnetic circuit structure with a magnet gap, and a voice coil. The magnetic circuit structure can concentrate a magnetic flux produced by the magnets into the magnet gap. When the electrical energy flows into the voice coil, and induced magnetic field can be created that interacts with the magnetic flux in the magnet gap. The voice coil may carry a current in a direction substantially perpendicular to the direction of the magnetic flux produced by the magnets, so that the interaction between the voice coil current and the magnet flux can cause linear oscillation of the voice coil within the length of the magnet gap, which moves the diaphragm in order to produce audible sound.

However, due to the limited internal space in the existing ultra slim micro-speaker, it is easy to cause mechanical defects such as soft bottoming and hard bottoming when the speaker work at a high power, in which case, contacts may occur between the diaphragm or the voice coil and the magnet circuit structure, and bring noise into the speaker system. Moreover, the winding height having an unsymmetrical relationship in the magnetic circuit results in different force factors (BL) generated by the different upper and lower winding heights of the voice coil in the magnetic circuit structure, respectively. It will increase the harmonics distortion of the speaker, resulting in an increase of the total harmonic distortion.

As in the above scheme, the existing ultra slim micro-speaker cannot guarantee the structural symmetry of the voice coil and the magnetic circuit due to the structural limitation. When the voice coil vibrates up and down in the magnetic circuit, the force transmission from the voice coil to the diaphragm is not balanced, it is difficult to meet the requirements of producing sound with low distortion in the speaker. Therefore, there is a need to design an ultra slim micro speaker with symmetrical voice coil and magnetic circuit and at the same time, enabling the soft bottoming space and the hard bottoming space to remain unchanged.

SUMMARY

The purpose of the invention is to provide a technical solution of an ultra slim micro-speaker, which requires a thin structure, needs to meet the design requirements of magnetic circuit symmetry in acoustic theory, and solves the problems existing in the structural design of the ultra slim micro-speaker. That is, under the premise of thin structure, design a symmetric structure of the voice coil and the magnetic circuit. could the ultra slim micro-speaker obtain low distortion when applying a large amplitude output, and improves the sound reproduction quality of ultra slim micro-speakers, so that users could hear more realistic sounds when using the ultra slim micro-speaker.

One embodiment of the present disclosure provides a structure of an ultra slim micro-speaker including a diaphragm, a magnetic circuit structure, and a voice coil. The magnetic circuit structure may include a yoke, side top plates, side magnets, top plate, and magnet. The magnetic circuit structure can concentrate a magnetic flux produced by the magnets into a magnet gap between the top plate and the side top plates. When a current flowing through the voice coil, the voice coil can cause linear oscillation, which forces the diaphragm to move with the voice coil together to produce audible sound.

Another embodiment of the present disclosure provides a solution optimized for structural design to improve the performance of ultra slim micro-speaker by arranging a middle gasket between the voice coil and the diaphragm, and at the same time, the soft bottoming space is not affected and the rate power of the speaker can be kept. With the added middle gasket, the voice coil can be positioned symmetrically in the magnetic circuit relative to the center horizontal plane of the top plate, and then the distance between the top of the top plate and the top of the voice coil can be equal to the distance between the bottom of the top plate and the bottom of the voice coil, which renders the winding height to have a symmetrical relationship in the magnetic circuit with reflecting its BL(x) curve with better symmetry. In this case, the non-linear parameter BL(x) curve will also be relatively symmetrical when the voice coil moves up and down, and so the speaker can get lower total harmonic distortion.

BRIEF DESCRIPTION OF THE DRAWINGS

The present disclosure may be better understood from reading the following description of non-limiting embodiments, with reference to the attached drawings. The components in the Figures are not necessarily to scale, emphasis instead being placed upon illustrating the principles of the invention. Moreover, in the Figures, like reference numerals designate corresponding parts throughout the different views, wherein.

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of components. Therefore, specific structural and functional details disclosed herein are not to be interpreted as limiting, but merely as a representative basis for teaching one skilled in the art to variously employ the present invention.

Figure 1A:
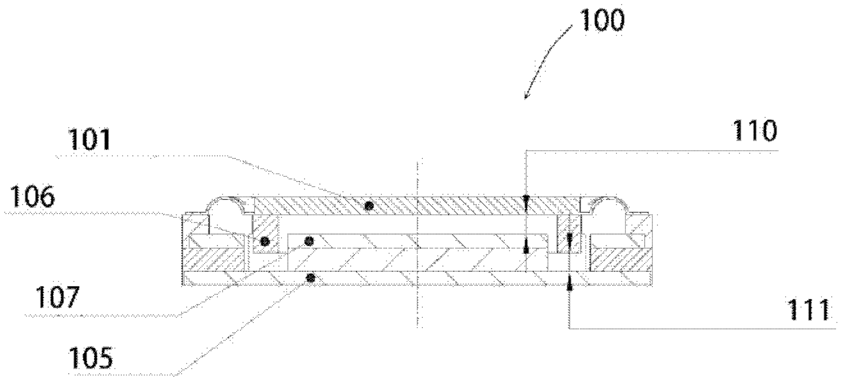
FIGS. 1A and 1B schematic diagrams illustrating a structure of an ultra slim micro-speaker according to an embodiment of the invention.
Figure 1B:
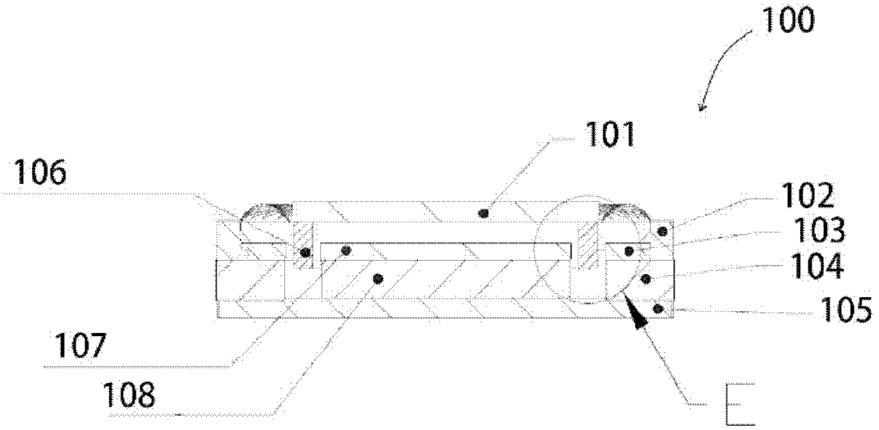
Figure 1C:
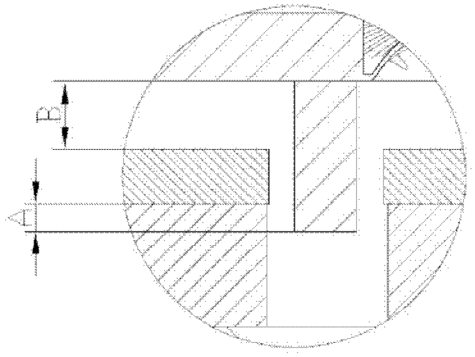
FIG. 1C is a close-up view illustrating a portion E of the ultra slim micro-speaker in FIG. 1B.

In an embodiment of the present disclosure, FIGS. 1A-1C illustrates a structure of the ultra slim micro-speaker 100 which includes a diaphragm 101, a magnetic circuit structure, and a voice coil 106. The magnetic circuit structure may include a yoke 105, side top plates 103, side magnets 104, top plate 107, and magnet 108. As shown in FIG. 1A, the side magnets 104 and the magnet 108 are respectively placed at the same level on the yoke 105 and spaced apart to form a magnetic gap therebetween. The top plate 107 is arranged on top of the magnet 108, and the side top plates 103 are respectively arranged on top of the side magnets 104 at the same level with the top plate 107. The magnet gap exists also between the top plate 107 and the side top plates 103. The voice coil 106 is connected to the diaphragm 101 and suspended into the magnet gap. Thus, a binding surface is formed between the voice coil 106 and the diaphragm 101. The ultra slim micro-speaker may further include a frame 102 for securing the magnet circuit therein. The frame 102 is connected to the diaphragm 101 via a free edge, such as a flexible folding ring. The magnetic circuit structure can concentrate a magnetic flux produced by the magnets into the magnet gap. When the electrical energy flows into the voice coil 106, and induced magnetic field can be created that interacts with the magnetic flux in the magnet gap. The voice coil 106 may carry a current in a direction substantially perpendicular to the direction of the magnetic flux produced by the magnets 104, 108, so that the interaction between the voice coil current and the magnet flux can cause linear oscillation of the voice coil 106 within the length of the magnet gap, which moves the diaphragm 101 in order to produce audible sound.

Since the internal space for the ultra slim micro-speaker as shown in FIG. 1A is limited, especially for the soft bottoming space 110 and the hard bottoming space 111, it is easy to cause mechanical defects such as soft bottoming and hard bottoming when the speaker work at a high power. In this case, contacts may occur between the diaphragm 101 or the voice coil 106 and the magnet circuit structure, and bring noise into the speaker system. Moreover, referring to FIGS. 1B and 1C, since the voice coil 106 used in the ultra slim micro-speaker generally has no bobbin, in order to reserve enough stroke space for the up and down movement of the voice coil, the distance between the top of the top plate 107 and the top of the voice coil 106 (distance B in FIG. 1C) is generally longer than the distance between the bottom of the top plate 107 and the bottom of the voice coil 106 (distance A in FIG. 1C). Based on the top and bottom of the top plate 107, the distance A is not equal to the distance B. In this case, the winding height has an unsymmetrical relationship in the magnetic circuit, which results in different force factors (BL) by the different upper and lower winding heights of the voice coil 107 in the magnetic circuit structure, respectively. It will increase the harmonics distortion of the speaker, resulting in an increase of the total harmonic distortion.

Figure 2A:
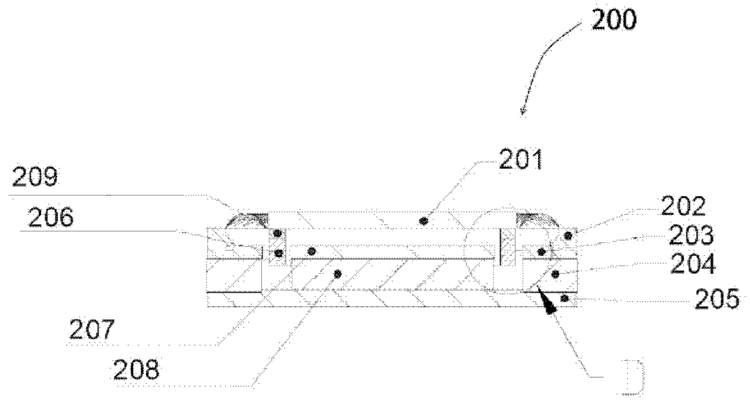
FIG. 2A is a schematic diagram illustrating a structure of an ultra slim micro-speaker according to another embodiment of the invention.
Figure 2B:
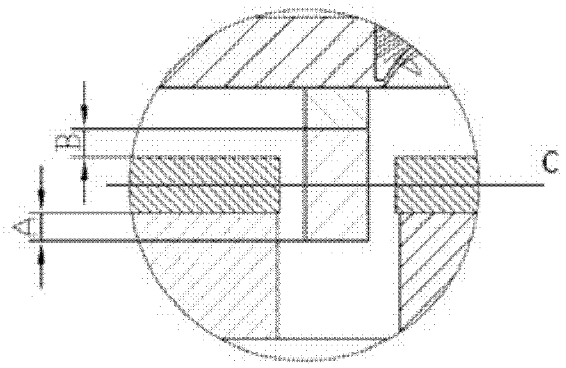
FIG. 2B is a close-up view illustrating a portion D of the ultra slim micro-speaker in FIG. 2A.

In another embodiment of the present disclosure, FIGS. 2A-2B illustrate an improved ultra slim micro-speaker 200 with an additional middle gasket 209 which is arranged and sandwiched at the bonding surface between the diaphragm 201 and the voice coil 206 and connected to the both.

As shown in FIG. 2A, the ultra slim micro-speaker 200 generally has a similar structure to that shown in FIG. 1A and includes a diaphragm 201, a magnetic circuit structure, and a voice coil 206. The magnetic circuit structure may include a yoke 205, side top plates 203, side magnets 204, top plate 207, and magnet 208. The magnetic circuit structure can concentrate a magnetic flux produced by the magnets into a magnet gap formed between the top plate 207 and the side top plates 203. As shown, the middle gasket 209 is sandwiched and connected between the voice coil 206 and the diaphragm 201, and the middle gasket 209 is suspended in the magnet gap, as shown in FIG. 2A. Moreover, the ultra slim micro-speaker may further include a frame 202 for securing the magnet circuit structure therein. As shown in 2A, the frame 202 is connected to the diaphragm 201 via a free edge, such as a flexible folding ring. When the electrical energy flows into the voice coil 206, an induced magnetic field is created that interacts with the magnetic flux in the magnet gap. The voice coil 206 carries a current in a direction substantially perpendicular to the direction of the magnetic flux produced by the magnets 204, 208, so that the interaction between the voice coil current and the magnet flux can cause linear oscillation of the voice coil 206 within the length of the magnet gap, which moves the diaphragm 201 in order to produce audible sound.

Still referring to FIG. 2A, in the structure of the ultra slim micro-speaker 200 provided in the present disclosure, the middle gasket 209 is added so that the voice coil 206 can be configured to be symmetrical with the magnetic circuit structure relative to the center horizontal plane of the top plate and the side top plates (line C of FIG. 2B). In this case, by adding the middle gasket instead of a section of the voice coil, based on the top and bottom of the top plate 207, the distance A between the bottom of the top plate 207 and the bottom of the voice coil 206 is equal to the distance B between the top of the top plate 207 and the top of the voice coil 206 in the vertical direction as shown in FIG. 2B, and the soft and hard bottoming structure will not be affected, namely, the middle gasket 209 is added to make the voice coil 206 and the magnetic circuit structure to be designed in a symmetrical way, and at the same time, the soft bottoming space and hard bottoming space are unchanged, and the rated power of the speaker can be maintained.

Figure 3:
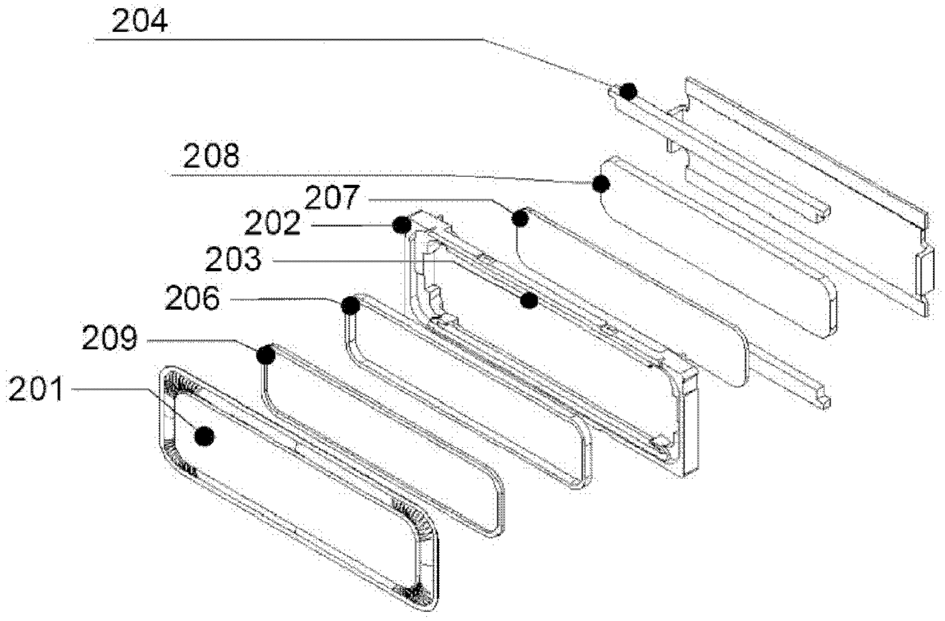
FIG. 3 is an exploded view diagram illustrating an example of the structure of the ultra slim micro-speaker according to the embodiment of the invention as shown in FIGS. 2A-2B.

Now referring to FIG. 3, by way of example, a product explosion diagram of the ultra slim micro-speaker as provided in the present disclosure is shown in FIG. 3 in the order of assembly, which in turn includes a diaphragm 201, a middle gasket 209, a voice coil 206, side top plates 203, a frame 202, a top plate 207, a magnet 208 and side magnets 204. In one example, the product of the ultra slim micro-speaker shown in FIG. 3 is rectangular, and accordingly all the components used in this speaker is arranged or shaped in a rectangular manner. Thus, the middle gasket 209 is configured as a rectangular ring. However, the middle gasket 209 can be alternatively shaped in various shapes such as but not limited to a square, a circle, a racetrack or the like, according to the various actual used scenes. In an embodiment, the middle gasket 209 may also be configured to be divided into multi-segment separately with one or more notches. The middle gasket 209 can be made from various materials, including but not limited to metal, plastic, paper, or other high temperature resistant or light-weight materials, which may result in further reducing the overall weight of the speaker. Moreover, the magnet circuit structure of the ultra slim micro-speaker 200 as shown in FIG. 3 comprises a magnet 8 and two side magnets 204. However, the magnet circuit may include the magnet circuit formed with a single magnet structure. Alternatively, the magnet circuit may be of multi-magnet structure, such as three-magnet, five-magnet or the like.

Figure 4:
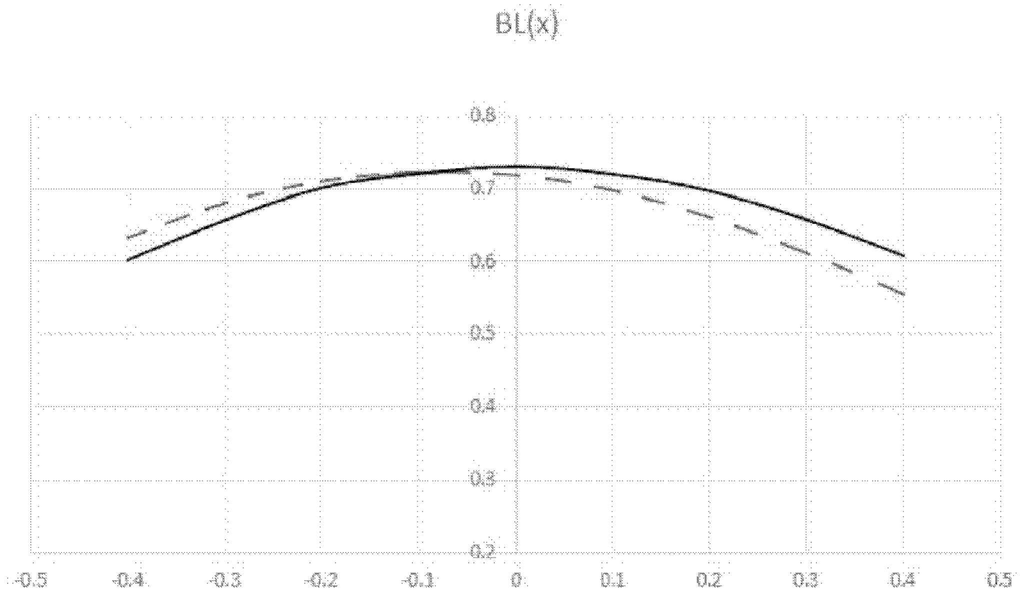
FIG. 4 is a graph illustrating the BL(x) curve comparison between the ultra slim micro-speaker in FIGS. 1A-1C and the ultra slim micro-speaker in FIGS. 2A-2B.

FIG. 4 illustrates a graph of the BL(x) curve comparison between the ultra slim micro-speaker of FIGS. 1A-1C and the ultra slim micro-speaker of FIGS. 2A-2B. In the graph of BL(x) curve, the vertical ordinate represents the value of BL(x), and the horizontal ordinate represents the displacement of the voice coil relative to the magnet circuit structure. The symmetry of the BL(x) curve can be only affected by the displacement of the voice coil relative to the top plate or the side top plate. In FIG. 4, The BL(x) curve drawn by the dotted line reflects the asymmetry of the voice coil and the magnetic circuit in the speaker as shown in FIGS. 1A-1C. The BL(x) curve with the dotted line is asymmetrical with respect to the central longitudinal axis (x=0 in FIG. 4), which indicates the unsymmetrical relationship of the voice coil and the magnetic circuit of the speaker of FIGS. 1A-1C. The unsymmetrical of the BL(x) curve will cause the ultra slim micro-speaker to have an imbalance force factor between the magnetic circuit structure and the voice coil when work at large-displacement vibration. In contrast, the BL(x) curve drawn by the solid line shows a much better symmetry relative to the central longitudinal axis (X=0), which reflects the symmetrical voice coil and magnetic circuit of the speaker as provided in the present disclosure as shown in FIGS. 2A and 2B. In this case, the symmetry of the BL(x) curve is better, which means that the winding height has a symmetrical relationship in the magnetic circuit, and the upper and lower winding heights are subject to the same magnetic flux density. That is, under the premise of thin structure, this design is of a symmetric structure of the voice coil and the magnetic circuit, and it may obtain low distortion when applying a large amplitude output, and improves the sound reproduction quality of ultra slim micro-speakers, so that users can hear more realistic sounds when using the speaker.

The aforesaid technical solution provided in the present disclosure enables the micro-speaker to obtain a relatively symmetrical BL(x) curve while keeping the structure ultra slim, so that the low frequency distortion is minimized specifically in the following aspects:

When assembling the vibration system, a middle gasket is added between the voice coil and the diaphragm;

In the design of the voice coil, the winding height and the magnetic circuit structure can be matched to design a symmetrical structure.

The present disclosure provides a technical solution of an ultra slim micro-speaker with a thin structure which meets the design requirements of magnetic circuit symmetry in acoustic theory. The ultra slim micro-speaker is provided with a symmetric structure of the voice coil and the magnetic circuit and improves the sound reproduction quality, so that users can hear more realistic sounds when using it. Therefore, the ultra slim micro-speaker of the present disclosure can be widely used in various field and bring improved performances, for example, it can be used in any integrated and thinning electronic product, such as but not limited to a mobile phone, a tablet, a computer or an audio playing device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A speaker, comprising:
a diaphragm;
a magnetic circuit structure including a magnet gap;
a voice coil suspended in the magnet gap, and
a middle gasket sandwiched between the diaphragm and the voice coil and being connected to the diaphragm and the voice coil,
wherein a distance between a top of the voice coil and a top of a top plate is equal a distance between a bottom of the voice coil and a bottom of the top plate in a vertical direction.

2. The speaker of claim 1, wherein the magnetic circuit structure further comprises a top plate and at least a side top plate, and the magnet gap is formed therebetween.

3. The speaker of claim 2, wherein the voice coil is configured to be symmetrical with the magnetic circuit structure relative to a center horizontal plane of the top plate and the at least side top plate.

4. The speaker of claim 1, wherein the middle gasket is configured as a ring.

5. The speaker of claim 1, wherein the middle gasket is formed in one of a rectangular shape, a circular shape, or a racetrack-like shape.

6. The speaker of claim 1, wherein the magnetic circuit structure further comprises a magnet structure formed with a single magnet.

7. The speaker of claim 1, wherein the magnet circuit structure is formed with a multi-magnet such as a three-magnet structure or a five-magnet structure.

8. The speaker of claim 1, wherein the middle gasket is made from a light-weight material.

9. The speaker of claim 8, wherein the middle gasket is made from at least one of metal, plastic, or paper.

10. The speaker of claim 1, wherein the speaker is an ultra slim micro-speaker.

11. The speaker of claim 1, wherein the speaker is used with an integrated and thin-profile electronic product.

12. The speaker of claim 11, wherein the integrated and thin-profile electronic product is at least a mobile phone, a tablet, a computer or an audio playing device.

13. A speaker, comprising:
a diaphragm;
a magnetic circuit structure including a magnet gap;
a voice coil suspended in the magnet gap and moving with the diaphragm to produce an audible sound, and
a middle gasket sandwiched between the diaphragm and the voice coil and being connected to the diaphragm and the voice coil,
wherein a distance between a top of the voice coil and a top of a top plate is equal a distance between a bottom of the voice coil and a bottom of the top plate in a vertical direction.

14. The speaker of claim 13, wherein the magnetic circuit structure further comprises a top plate and at least a side top plate, and the magnet gap is formed therebetween.

15. The speaker of claim 14, wherein the voice coil is configured to be symmetrical with the magnetic circuit structure relative to a center horizontal plane of the top plate and the at least side top plate.

16. The speaker of claim 13, wherein the middle gasket is configured as a ring.

17. The speaker of claim 13, wherein the middle gasket is formed in one of a rectangular shape, a circular shape, or a racetrack-like shape.

18. A speaker, comprising:
- a diaphragm;
- a magnetic circuit structure including a magnet gap and concentrating magnetic flux into the magnetic gap;
- a voice coil suspended in the magnet gap and moving with the diaphragm to produce an audible sound, and
- a middle gasket sandwiched between the diaphragm and the voice coil and being connected to the diaphragm and the voice coil,
- wherein a distance between a top of the voice coil and a top of a top plate is equal a distance between a bottom of the voice coil and a bottom of the top plate in a vertical direction.

* * * * *